US012785192B2

(12) United States Patent
Jeong

(10) Patent No.: US 12,785,192 B2
(45) Date of Patent: Nov. 3, 2026

(54) BATTERY MOUNTING STRUCTURE FOR PBVS

(71) Applicants: Hyundai Motor Company, Seoul (KR); Kia Corporation, Seoul (KR)

(72) Inventor: Seung Min Jeong, Whasung-Si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 1080 days.

(21) Appl. No.: 17/891,549

(22) Filed: Aug. 19, 2022

(65) Prior Publication Data

US 2023/0253660 A1 Aug. 10, 2023

(30) Foreign Application Priority Data

Feb. 7, 2022 (KR) ........................ 10-2022-0015599

(51) Int. Cl.

| | |
|---|---|
| ***H01M 50/244*** | (2021.01) |
| ***B60K 1/04*** | (2019.01) |
| ***H01M 50/202*** | (2021.01) |
| ***H01M 50/249*** | (2021.01) |
| ***H01M 50/264*** | (2021.01) |

(52) U.S. Cl.

CPC ............. *H01M 50/244* (2021.01); *B60K 1/04* (2013.01); *H01M 50/202* (2021.01); *H01M 50/249* (2021.01); *H01M 50/264* (2021.01); *B60K 2001/0438* (2013.01); *H01M 2220/20* (2013.01)

(58) Field of Classification Search

CPC .................................................. H01M 50/244

See application file for complete search history.

(56) References Cited

U.S. PATENT DOCUMENTS

2013/0126255 A1 5/2013 Saeki
2019/0260060 A1* 8/2019 Atsushi
2021/0387583 A1* 12/2021 Ki

FOREIGN PATENT DOCUMENTS

EP 4410591 A1 * 8/2024 .......... H01M 50/383
JP 2015-071336 4/2015
KR 10-2012-0060022 6/2012
KR 10-2014-0002430 1/2014
KR 10-2019-0029954 3/2019
KR 102251728 B1 * 5/2021 ............ C09J 201/00
KR 10-2021-0119213 10/2021
KR 10-2021-0121880 10/2021
KR 10-2021-0130883 11/2021

* cited by examiner

*Primary Examiner* — Nicole M. Buie-Hatcher
*Assistant Examiner* — Krishna R Hammond
(74) *Attorney, Agent, or Firm* — MORGAN, LEWIS & BOCKIUS LLP

(57) ABSTRACT

A battery mounting structure includes a chassis cross member including a curved cross-section and provided on the lower side of a floor panel; a mounting bracket detachably mounted to a lower side of the chassis cross member while an assembly position of the mounting bracket is guided; and a fastening bolt that passes through a battery case located under the mounting bracket from below the battery mounting structure and is then fastened to the mounting bracket, supporting the battery case with respect to the mounting bracket.

12 Claims, 5 Drawing Sheets

BATTERY MOUNTING STRUCTURE FOR PBVS

CROSS-REFERENCE TO RELATED APPLICATION(S)

The present application claims priority to Korean Patent Application No. 10-2022-0015599, filed on Feb. 7, 2022, the entire contents of which is incorporated herein for all purposes by this reference.

BACKGROUND OF THE PRESENT DISCLOSURE

Field of the Present Disclosure

The present disclosure relates to a technology for mounting a high voltage battery in an electric vehicle or the like.

Description of Related Art

Purpose built vehicles (PBVs) are configured as a combination of a drive module related to driving of a vehicle and a life module configuring various types of boarding and loading spaces according to market demands to meet the market trend of diversified small-quantity production.

Therefore, PBVs have an advantage of rapidly producing a vehicle that meets the needs of the market by changing only the life module.

Furthermore, in line with the recent trend toward eco-friendliness in vehicle technology, the drive module tends to be developed to have a high-voltage battery (hereinafter, simply referred to as a "battery") mounted thereto.

Meanwhile, because the time required for charging the battery of an electric vehicle is longer than the time required for refueling of an internal combustion engine vehicle, when the battery provided in the vehicle is discharged, replacement of the battery by another charged battery is considered.

In the case of operating the battery of an electric vehicle in a replaceable manner as described above, the durability of the part where the battery is mounted to the vehicle is emerging as a major technology in consideration of frequent removal and installation of the battery.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery mounting structure for PBVs, which enables the mounting bracket to be assembled in the correct position while facilitating easy replacement of a mounting bracket when the mounting bracket is damaged due to frequent removal and installation of a battery, preventing deterioration of the battery assembly property, provides a mounting bracket having a small volume, preventing a reduction in the capacity of the battery, and provides a strong mounting state of the mounting bracket to ensure a stable mounting state of the battery.

To attain the above objective, a battery mounting structure for PBVs according to an exemplary embodiment of the present disclosure may include: a chassis cross member including a curved cross-section and provided on the lower side of a floor panel; a mounting bracket detachably mounted to a lower side of the chassis cross member while an assembly position of the mounting bracket is guided; and a fastening bolt that passes through a battery case located under the mounting bracket from below the battery mounting structure and is then fastened to the mounting bracket, supporting the battery case with respect to the mounting bracket.

The chassis cross member may have a cross-section of a curved shape of "W" and may be provided on the lower side of the floor panel to connect side sills on first and second sides of a chassis.

The mounting bracket may be configured so that the assembly position thereof to the chassis cross member is guided by a guide bolt protruding downwards from the chassis cross member.

The guide bolt may be provided to pass through the floor panel and the chassis cross member from above the floor panel, and the guide bolt may be provided to protrude downwards through a peak portion in a center portion of the cross-section of the chassis cross member.

The mounting bracket may have a plurality of mounting legs guided by and coupled to the guide bolt, and the mounting bracket may have a plurality of mounting flanges coupled in close contact with external inclined surfaces on first and second sides of the cross-section of the chassis cross member.

The mounting bracket may be configured so that an imaginary straight line connecting the plurality of mounting legs to each other is aligned to cross an imaginary straight line connecting the plurality of mounting flanges to each other.

The mounting bracket may be provided so that the plurality of mounting legs and the plurality of mounting flanges are symmetric to each other with respect to a mounting body facing an upper surface of the battery case.

A fastening hole through which the fastening bolt passes may be formed in the mounting body, and a mounting nut to which the fastening bolt is fastened may be integrally formed on an upper side of the fastening hole.

The mounting body may have a recess portion provided below the mounting nut.

A side hole may be formed in the mounting flange, a side bolt may be inserted into the side hole, and the chassis cross member may be provided with a side fixing nut to which the side bolt passing through the side hole and the chassis cross member is fastened.

The present disclosure may include: a frame provided to surround the battery case located under the floor panel; and a plurality of fixing bolts configured to fix an external portion of the battery case to the frame.

The frame may include: two frame side members provided in a longitudinal direction of the chassis on first and second sides of the chassis; and a plurality of frame cross members provided in the transverse direction of the chassis to connect the frame side members, wherein battery side members may be provided in the external portions on both sides of the battery case, and wherein the battery side members may be fixed to the frame side members by the fixing bolt.

At least a portion of the battery case may be positioned in a space formed by the frame side members and the frame cross members positioned around the battery case.

Furthermore, a mounting bracket according to an exemplary embodiment of the present disclosure may include: a mounting body coupled to a lower side of the chassis cross member including a cross-section of "W" and including a mounting nut fastened with a fastening bolt inserted from below the chassis cross member; a plurality of mounting legs connected to the mounting body and inserted from below into a peak portion in the center portion of the cross-section of the chassis cross member to be coupled thereto; and a plurality of mounting flanges connected to the mounting body to come into close contact with the external inclined surfaces on first and second sides of the cross-section of the chassis cross member.

A guide hole into which a guide bolt protruding downwards from the lower side of the chassis cross member is inserted may be formed on the mounting leg.

The mounting nut of the mounting body may be located below a peak portion of the chassis cross member, and the mounting body may be provided with a recess portion on the lower side thereof by an upwardly recessed portion where the mounting nut is provided.

An imaginary straight line connecting the plurality of mounting legs to each other and an imaginary straight line connecting the plurality of mounting flanges to each other may be configured to cross in the mounting body.

The mounting flange may be provided with a side hole through which a side bolt coupled to the chassis cross member passes.

The present disclosure enables the mounting bracket to be assembled in the correct position while facilitating easy replacement of a mounting bracket when the mounting bracket is damaged due to frequent removal and installation of a battery, preventing deterioration of the battery assembly property, provides a mounting bracket including a small volume, preventing a reduction in the capacity of the battery, and provides a strong mounting state of the mounting bracket to ensure a stable mounting state of the battery.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
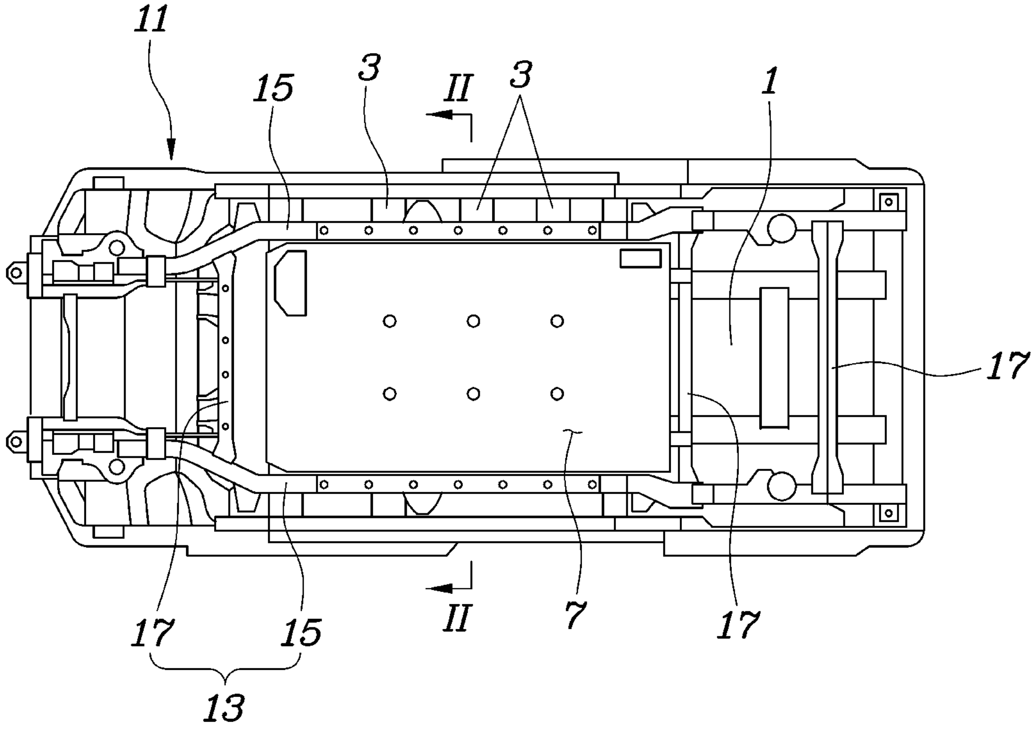
FIG. 1 is a view exemplarily illustrating a battery mounting structure for PBVs according to an exemplary embodiment of the present disclosure, which shows the lower side of a vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A specific structural or functional description of embodiments of the present disclosure set forth in the specification or application is provided merely for describing the exemplary embodiment according to an exemplary embodiment of the present disclosure. Therefore, the exemplary embodiments of the present disclosure may be implemented in various forms, and the present disclosure should not be construed as being limited to the exemplary embodiments described in the specification or application.

Various changes and modifications may be made to the exemplary embodiments according to an exemplary embodiment of the present disclosure, and therefore various exemplary embodiments will be illustrated in the drawings and described in the specification or application. However, it should be understood that embodiments according to the concept of the present disclosure are not limited to the particular disclosed exemplary embodiments of the present disclosure, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, various exemplary embodiments of the present disclosure will be described in detail with reference to the accompanying drawings. Similar or like reference signs presented in the respective drawings designate similar or like elements.

Referring to FIGS. 1 to 7, a battery mounting structure for PBVs according to an exemplary embodiment of the present disclosure includes: a chassis cross member 3 including a curved cross-section and provided on the lower side of a floor panel 1; a mounting bracket 5 detachably mounted to the lower side of the chassis cross member 3 while the assembly position thereof is guided; and a fastening bolt 9 that passes through a battery case 7 located under the mounting bracket 5 from below and is then fastened to the mounting bracket 5, supporting the battery case 7 with respect to the mounting bracket 5.

That is, the battery case 7 is fixed to the chassis cross member 3 below the floor panel 1, and the mounting bracket 5 is detachably provided between the battery case 7 and the chassis cross member 3, so that when the mounting bracket 5 is damaged by repetitive replacement of the battery case 7, it may be easily replaced.

For reference, the vehicle in FIG. 1 is a PBV, and a frame 13 forming a drive module and the battery case 7 are provided below a chassis 11 forming a life module, and the frame is provided to surround the battery case 7.

The frame 13 includes two frame side members 15 provided in the longitudinal direction of the chassis on both sides of the chassis and a plurality of frame cross members 17 provided in the transverse direction of the chassis to connect the frame side members 15.

At least a portion of the battery case 7 is positioned in a space formed by the frame side members 15 and the frame cross members 17 positioned around the battery case 7.

That is, the frame 13 is provided with the frame cross members 17 only around the battery case 7, instead of being provided in the portion where the battery case 7 is located, so that the battery case 7 may be provided at substantially the same height as the frame 13 without considering the installation space of the frame cross members 17 of the frame 13.

Therefore, it is possible to increase the volume of the battery case 7, increasing the capacity of the battery accommodated, improve the safety of the battery, and significantly increase the degree of design freedom in terms of securing an appropriate ground height of the vehicle.

Figure 2:
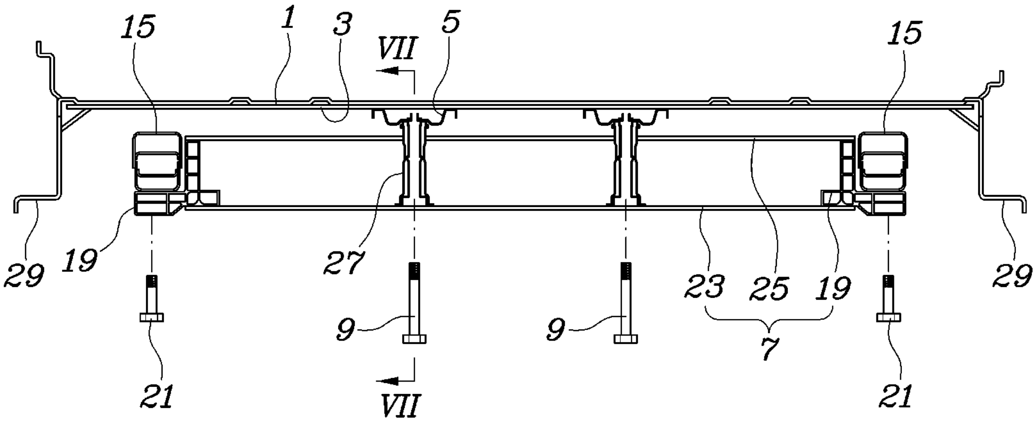
FIG. 2 is a cross-sectional view taken along line II-II in FIG. 1.
Figure 3:
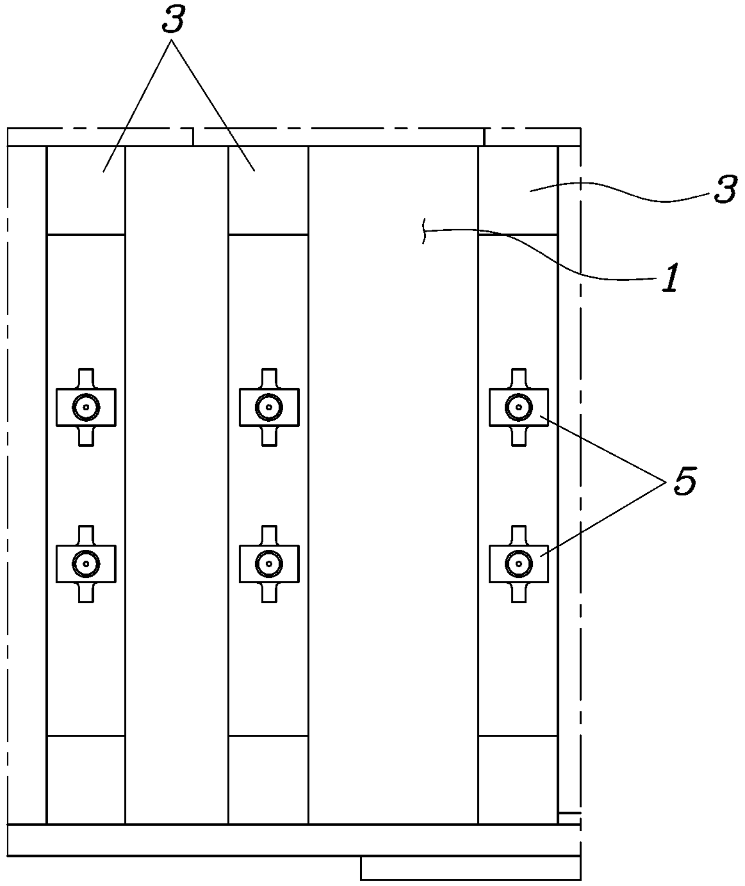
FIG. 3 is a view exemplarily illustrating a floor panel, a chassis cross member, and a mounting bracket in a state in which the battery and the frame are removed from FIG. 1.
Figure 4:
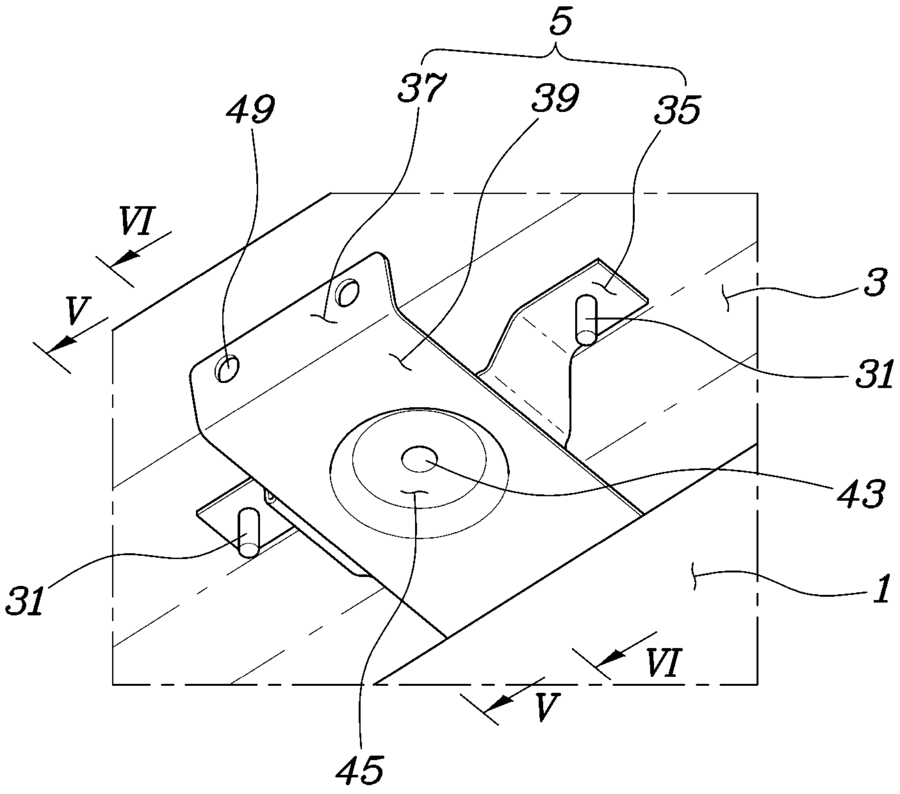
FIG. 4 is a perspective view of the mounting bracket in FIG. 3.
Figure 5:
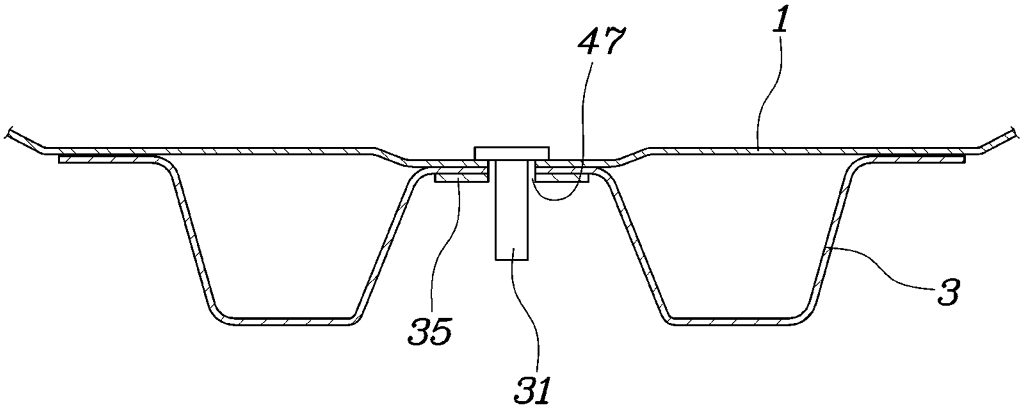
FIG. 5 is a cross-sectional view taken along line V-V in FIG. 4.
Figure 6:
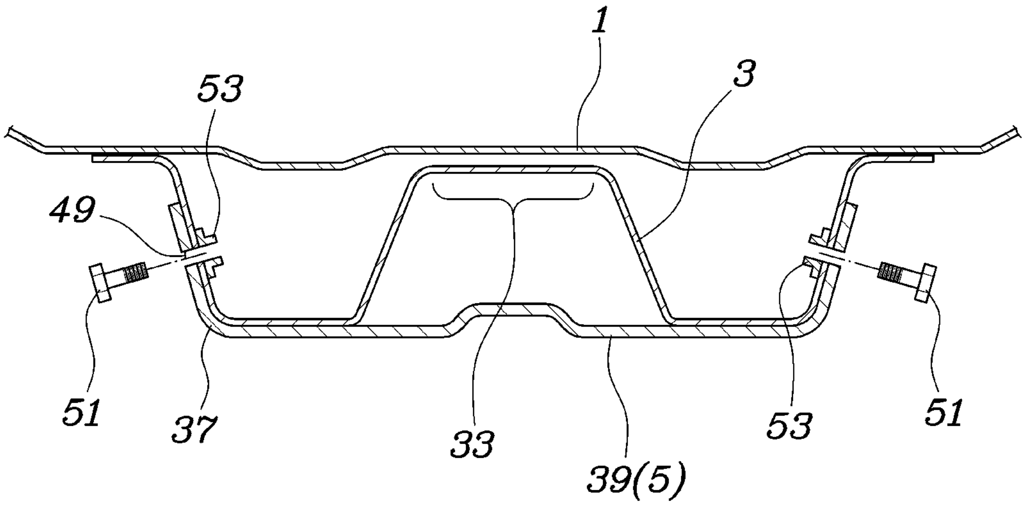
FIG. 6 is a cross-sectional view taken along line VI-VI in FIG. 4.

Referring to FIG. 2, battery side members 19 are provided on both sides of the battery case 7, and the battery side members 19 are fixed to the frame side members 15 by a plurality of fixing bolts 21.

That is, the center portion of the battery case 7 is fixed to the chassis cross member 3 by the fastening bolt 9, and both sides of the battery case 7 are fixed to the frame side members 15 by the fixing bolt 21.

For reference, in FIG. 2, the battery case 7 is shown as a lower case 23, an upper case 25, and battery side members 19, and a mounting bush 27 between the upper case 25 and the lower case 23 to support the same is shown in the portion through which the fastening bolt 9 passes, and an internal battery is omitted.

The chassis cross member 3 including a cross-section of a curved shape of "W" is provided on the lower side of the floor panel 1 to connect the side sills 29 on both sides of the chassis.

Furthermore, the mounting bracket 5 is configured to guide the assembly position to the chassis cross member 3 by a guide bolt 31 protruding downwards from the chassis cross member 3.

In the present exemplary embodiment of the present disclosure, the guide bolt 31 is provided to passing through the floor panel 1 and the chassis cross member 3 from above and to protrude downwardly from a peak portion 33 at the center portion of the cross section of the chassis cross member 3.

Meanwhile, the mounting bracket 5 has a plurality of mounting legs 35 guided by and coupled to the guide bolt 31 and a plurality of mounting flanges 37 coupled in close contact with external inclined surfaces on both sides of the cross-section of the chassis cross member 3.

The mounting bracket 5 has a structure in which an imaginary straight line connecting the plurality of mounting legs 35 to each other crosses an imaginary straight line connecting the plurality of mounting flanges 37 to each other.

The mounting bracket 5 is provided so that the plurality of mounting legs 35 and the plurality of mounting flanges 37 are symmetric to each other with respect to a mounting body 39 facing the upper surface of the battery case 7.

That is, the mounting bracket 5 is provided with a mounting body 39 coupled to the lower side of the chassis cross member 3 and including a mounting nut 41 fastened with the fastening bolt 9, a plurality of mounting legs 35 connected to the mounting body 39 and inserted from below into the peak portion 33 in the center portion of the cross-section of the chassis cross member 3 to be coupled thereto, and a plurality of mounting flanges 37 connected to the mounting body 39 to come into close contact with the external inclined surfaces on both sides of the cross-section of the chassis cross member 3.

A fastening hole 43 through which the fastening bolt 9 passes is formed in the mounting body 39, and a mounting nut 41 to which the fastening bolt 9 is fastened is integrally formed on the upper side of the fastening hole 43.

Furthermore, the mounting body 39 has a recess portion 45 provided below the mounting nut 41.

Figure 7:
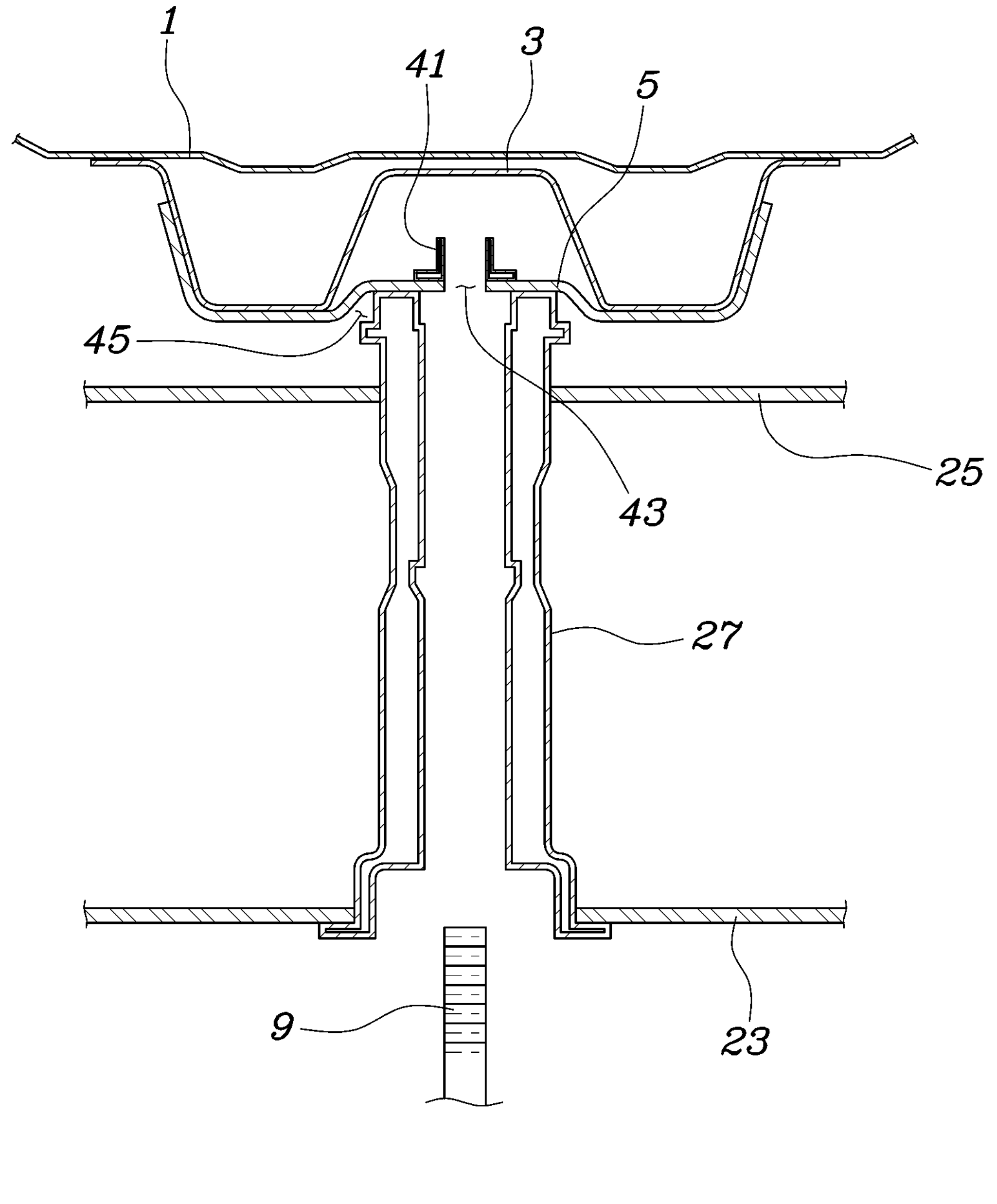
FIG. 7 is a cross-sectional view taken along line VII-VII in FIG. 2.

Therefore, as shown in FIG. 7, the mounting bracket 5 may be mounted in close contact with the lower side of the chassis cross member 3 so that the volume of a portion protruding downwards from the chassis cross member 3 is very small, and the recess portion 45 may accommodate the protrusion of the upper side of the battery case 7, maximizing the capacity of a battery accommodated in the battery case 7 without reducing it.

A guide hole 47 into which the guide bolt 31 protruding downwards from the lower side of the chassis cross member 3 is inserted is formed on the mounting leg 35.

Therefore, when assembling the mounting bracket 5 to the chassis cross member 3, the guide bolt 31 may be assembled to be inserted into the guide hole 47 of the mounting leg 35, which enables assembly of the mounting bracket 5 to the chassis at an accurate position, securing the accuracy for effective subsequent assembly of the battery case 7.

A side hole 49 is formed in the mounting flange 37, a side bolt 51 is inserted into the side hole 49, and the chassis cross member 3 is provided with a side fixing nut 53 to which the side bolt 51 passing through the side hole 49 is fastened.

Therefore, if the mounting flange 37 is fixed to the chassis cross member 3 using the side bolt 51, the mounting leg 35 of the mounting bracket 5 may be fixed by a fastening nut fastened to the guide bolt 31, and the mounting flange 37 may be coupled to the chassis cross member 3 by the side bolt 51, securing a robust mounting state.

The robust mounting state of the mounting bracket 5 described above makes it possible to secure a stable mounting state of the battery case 7.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery mounting structure for a vehicle, the battery mounting structure comprising:

a chassis cross member including a W-shaped curved cross-section and provided to a lower side of a floor panel, wherein a guide bolt passes through the floor panel and the chassis cross member to protrude downwards from a peak portion of the W-shaped curved cross-section;

a mounting bracket detachably mounted to a lower side of the chassis cross member, the mounting bracket comprising:

a mounting body facing an upper surface of a battery case;

a plurality of mounting legs extending from the mounting body and each having a guide hole configured to receive the guide bolt to guide an assembly position of the mounting bracket; and a plurality of mounting flanges extending from the mounting body and coupled in contact with external inclined surfaces of the W-shaped curved cross-section;

a fastening bolt that passes through a battery case located under the mounting bracket, from below the battery mounting structure and is then fastened to a mounting nut, integrally formed on an upper side of the mounting body, for supporting the battery case with respect to the mounting bracket; and a side bolt passing through a side hole formed in the mounting flanges and fastened to the chassis cross member, such that the mounting bracket is fixed to the chassis cross member by the side bolt before the battery case is supported by the fastening bolt.

2. The battery mounting structure of claim 1, wherein the mounting bracket is configured so that an imaginary straight line connecting the plurality of mounting legs to each other is aligned to cross an imaginary straight line connecting the plurality of mounting flanges to each other.

3. The battery mounting structure of claim 1, wherein the plurality of mounting legs and the plurality of mounting flanges are symmetric to each other with respect to the mounting body.

4. The battery mounting structure of claim 1, wherein the mounting nut is positioned between the peak portion of the chassis cross member and the mounting body.

5. The battery mounting structure of claim 1, wherein the mounting body includes a recess portion provided below the mounting nut and upwardly recessed.

6. The battery mounting structure of claim 5, wherein the recess portion is configured to receive a mounting bush of the battery case therein.

7. The battery mounting structure of claim 1, further including:

a frame provided to surround the battery case located under the floor panel; and a plurality of fixing bolts configured to fix an external portion of the battery case to the frame.

8. The battery mounting structure of claim 7, wherein the frame includes:

first and second frame side members provided in a longitudinal direction of the chassis on first and second sides of the chassis; and a plurality of frame cross members provided in a transverse direction of the chassis to connect the first and second frame side members, wherein battery side members are provided in external portions on first and second sides of the battery case, and wherein the battery side members are fixed to the first and second frame side members by the fixing bolts.

9. The battery mounting structure of claim 8, wherein at least a portion of the battery case is positioned in a space formed by the first and second frame side members and the frame cross members positioned around the battery case.

10. A mounting bracket comprising:

a mounting body coupled to a lower side of a chassis cross member including a cross-section in shape of "W" and including a mounting nut integrally formed on an upper side of the mounting body to be fastened with a fastening bolt inserted from below the chassis cross member;

a plurality of mounting legs connected to the mounting body and inserted from below the chassis cross member into a peak portion in a center portion of the cross-section of the chassis cross member to be coupled thereto, wherein each mounting leg is formed with a guide hole for receiving a guide bolt protruding downwards from the peak portion of the chassis cross member; and a plurality of mounting flanges connected to the mounting body and each having a side hole for receiving a side bolt to be fastened to the chassis cross member while coming into contact with external inclined surfaces on first and second sides of the cross-section of the chassis cross member, wherein the mounting bracket is configured to be fixed to or detached from the chassis cross member by the side bolt before a battery case is supported by the fastening bolt.

11. The mounting bracket of claim 10, wherein the mounting nut of the mounting body is located below a peak portion of the chassis cross member, and wherein the mounting body is provided with a recess portion on a lower side of the mounting body at a portion of the mounting body where the mounting nut is provided.

12. The mounting bracket of claim 10, wherein an imaginary straight line connecting the plurality of mounting legs to each other and an imaginary straight line connecting the plurality of mounting flanges to each other are aligned to cross in the mounting body.

* * * * *